(12) United States Patent
Botargues et al.

(10) Patent No.: US 8,078,345 B2
(45) Date of Patent: Dec. 13, 2011

(54) METHOD AND DEVICE FOR AUTOMATICALLY CONTROLLING AN EMERGENCY DESCENT OF AN AIRCRAFT

(75) Inventors: Paule Botargues, Toulouse (FR); Jean-Philippe Joignet, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 403 days.

(21) Appl. No.: 12/401,475

(22) Filed: Mar. 10, 2009

(65) Prior Publication Data

US 2009/0228161 A1    Sep. 10, 2009

(30) Foreign Application Priority Data

Mar. 10, 2008    (FR) ..................................... 08 01288

(51) Int. Cl.
*G06G 7/70*    (2006.01)

(52) U.S. Cl. ................ 701/16; 701/11; 701/15; 701/14; 701/7; 701/3; 244/118.5

(58) Field of Classification Search .................... 701/11, 701/5, 14, 7, 3, 1; 244/118.5
See application file for complete search history.

(56) References Cited

U.S. PATENT DOCUMENTS

| 4,314,341 | A | 2/1982 | Kivela | |
|---|---|---|---|---|
| 6,507,776 | B1 | 1/2003 | Fox | |
| 2003/0132344 | A1* | 7/2003 | Johnson et al. | ............. 244/118.5 |
| 2004/0094666 | A1 | 5/2004 | Rogitz | |

OTHER PUBLICATIONS

Preliminary Search Report dated Oct. 1, 2008.

* cited by examiner

*Primary Examiner* — Behrang Badii
(74) *Attorney, Agent, or Firm* — Dickinson Wright PLLC

(57) ABSTRACT

A method and device automatically engage an emergency descent function of an aircraft as a function of pressure variation measured in the cabin of the aircraft.

7 Claims, 3 Drawing Sheets

METHOD AND DEVICE FOR AUTOMATICALLY CONTROLLING AN EMERGENCY DESCENT OF AN AIRCRAFT

FIELD OF THE INVENTION

The present invention relates to a method and a device for the automatic control of an emergency descent of an aircraft, in particular of a transport airplane.

It is known that civil transport airplanes must be pressurized, since during cruising flight, an airplane deploys at an altitude which is often greater than 30 000 feet (about 9000 meters), for which the outside air is too lean in oxygen (and also too cold and too dry) to be compatible with life. So, pressurization systems are fitted to airplanes so as to retain a breathable atmosphere onboard. In particular, international aeronautical regulations require that any public transport airplane which flies at an altitude of greater than 20 000 feet (about 6000 meters) be pressurized and that it establish in the cabin an equivalent altitude which does not exceed 8000 feet (about 2400 meters) during normal flight.

BACKGROUND OF THE RELATED ART

It may however transpire, following a fault or an incident, that the pressurization of the airplane can no longer be maintained at an acceptable level. A regulatory procedure then compels the pilot to take the airplane down, as rapidly as possible, to a breathable altitude of 10 000 feet (about 3000 meters). This procedure is called an emergency descent.

In this case, the crew is responsible for the various tasks related to the initiation of the descent, as well as to the management of the descent until leveling off at low altitude.

It may nevertheless transpire, although very rarely, that the crew is no longer in a position to enter the commands required for piloting the airplane, for example in the case of a pressurization fault that has caused the crew to lose consciousness. The airplane is in this case left to itself, although it is absolutely necessary to perform an emergency descent. If, in such a situation, the automatic pilot is engaged, the flight is continued automatically until the fuel reserves are totally exhausted, following which the airplane drops.

Other circumstances such as the shattering of an engine causing a hole in the structure of the airplane for example may lead to the same situation. The inability of the crew to pilot the airplane in such circumstances may therefore have catastrophic consequences.

To remedy this type of situation, an automatic piloting system is known which, when it is engaged, makes it possible to carry out the emergency descent in an automatic manner, that is to say without requiring the aid of a pilot. Moreover, the engagement of an automatic emergency descent such as this can be carried out, either manually by the pilot, or also in an automatic manner. A mode of automatic engagement of a descent function is based, generally, on the absence of reaction of the crew to an alert which indicates an excessive altitude of the cabin. To detect an excessive altitude, the pressure of the air inside the cabin is measured, and an alert is emitted when this pressure is below a predetermined pressure threshold.

This standard solution exhibits the drawback of triggering the emergency descent function only when the pressure of the air in the cabin falls to said pressure threshold. However, so as not to cause untimely triggerings, it is necessary for this pressure threshold not to be too high. However, there may be a relatively significant duration between the occurrence of a pressurization problem and the attaining of this pressure threshold. And it is known that the longer the exposure of an organism to an insufficient pressure, the greater the risk of hypoxia. Consequently, this standard solution for automatically triggering an emergency descent is not completely satisfactory.

SUMMARY OF THE INVENTION

The present invention relates to a method of automatic control of an emergency descent of an aircraft, in particular of a transport airplane, which makes it possible to remedy the aforesaid drawbacks.

For this purpose, according to the invention, said method according to which, when an automatic emergency descent function is engaged, the following successive operations are carried out:
a) a set of vertical directives is determined automatically, said directives comprising:
   a target altitude which represents an altitude to be attained by the aircraft at the end of the emergency descent; and
   a target speed which represents a speed that the aircraft must comply with during the emergency descent;
b) a set of lateral directives, which represents a lateral maneuver to be carried out during the emergency descent, is determined automatically; and
c) the aircraft is guided automatically so that it complies simultaneously with said set of vertical directives and said set of lateral directives until it attains said target altitude which it thereafter maintains, said automatic guidance possibly being interrupted by an action of a pilot of the aircraft,
is noteworthy in that, to automatically engage said emergency descent function, the following operations are carried out in an automatic manner:
α1) a variation in altitude of the cabin of the aircraft, which depends on a variation in the pressure measured inside the cabin, is determined;
β1) an engagement criterion which depends on said variation in altitude of the cabin is determined;
γ1) this engagement criterion is compared with a predetermined threshold value; and
δ1) said emergency descent function is engaged when said engagement criterion is above said threshold value for a predetermined duration.

Thus, by virtue of the invention, account is taken of the variation in altitude of the cabin, that is to say of the variation in the pressure inside the cabin, to determine an automatic criterion for engaging the (automatic) emergency descent function. Consequently, as specified below, the emergency descent is triggered (automatically) as soon as a significant drop in the pressure is observed inside the cabin, without having to wait for the pressure to dip sufficiently and cross a critical pressure threshold as in the aforesaid standard solution.

By virtue of the invention, it is therefore possible to advance, in the event of a pressurization problem, the automatic engagement of the (automatic) emergency descent function. The time thus saved in the triggering of the emergency descent makes it possible to curtail to the maximum the time spent by the crew and the passengers at too high an altitude, incompatible with human life, thus limiting the risk of hypoxia.

In a first simplified embodiment, said engagement criterion directly represents said variation in altitude of the cabin.

Furthermore, in a second preferred embodiment, in an advantageous manner:

in step α1), an altitude of the cabin of the aircraft, which depends on a pressure measured inside the cabin, is moreover determined; and in step β1), an engagement criterion is determined as a function at one and the same time of said variation in altitude of the cabin (which depends on a measured variation in the pressure inside the cabin) and of said altitude of the cabin (which depends on a pressure measured inside the cabin).

In this case, in an advantageous manner, in step β1), one of the following engagement criteria x1, x2 and x3 is calculated:

$$\begin{cases} x1 = G1ac.Ac + G1vac.Vac \\ x2 = [(G2ac.Ac)^2 + (G2vac.Vac)^2]^{1/2} \\ x3 = [(G3ac.Ac)^n + (G3vac.Vac)^n]^{1/n} \end{cases}$$

for which:
Ac represents said altitude of the cabin;
Vac represents said variation in altitude of the cabin;
n is an integer greater than 2; and
G1ac, G2ac, G3ac, G1vac, G2vac and G3vac are predetermined gain values.

Within the framework of the present invention, it is considered that the altitude of the cabin corresponds to the altitude at which the pressure of the outside air is equal to the pressure measured in the cabin.

Additionally, it is known that if the aircraft suffers significant structural damage, it may be necessary, in order to avoid causing additional damage that might be irreparable, to carry out the emergency descent at a limited target speed. Specifically, in the event of structural damage, it is preferable not to fly the aircraft at its maximum speed, since the latter is rated for an intact aircraft. In particular, an aircraft weakened by a sizable hole in its structure may not support the loads generated by too high a descent speed. However, currently, only the crew is in a position to assert whether or not the aircraft has suffered structural damage, and to order a moderate emergency descent if they deem it necessary to minimize the stress to the structure of the aircraft (limited speed, little airbraking, etc.).

Thus, to remedy this problem, in a preferred embodiment, in step a), the following operations are moreover carried out in an automatic manner:

α2) the value of at least one parameter making it possible to detect structural damage of the aircraft is monitored and, in the event of detecting structural damage, a severity level of said structural damage is determined; and β2) said target speed is adapted to said severity level of the structural damage.

In this preferred embodiment, advantageously, in an automatic manner:

in step α2):
a variation in the pressure of the air in the cabin is monitored; and
the size of a hole in the structure of the aircraft, corresponding to structural damage, is estimated as a function of said variation in the pressure of the air in the cabin; and in step β2), the target speed is adapted to said estimated size of the hole in the structure of the aircraft.

Thus, by virtue of this preferred embodiment, it is possible to detect structural damage, and, in the event of detecting such structural damage, to adapt the target speed (that is to say the descent speed during the emergency descent) to the severity of said structural damage. This preferred embodiment therefore makes it possible to adapt the speed of the aircraft to the state of its structure. Moreover, this adaptation is carried out automatically, this being particularly advantageous when the pilot is no longer able to carry out such an adaptation, for example in the event of loss of consciousness.

Additionally, in an advantageous manner, means are also provided allowing a pilot to manually engage said emergency descent function.

The present invention also relates to a device for the automatic control of an emergency descent of an aircraft, in particular of a transport airplane.

For this purpose, according to the invention, said device of the type comprising:

engagement means able to engage an automatic emergency descent function;

means for determining, automatically, a set of vertical directives, comprising:
a target altitude which represents an altitude to be attained by the aircraft at the end of the emergency descent; and
a target speed which represents a speed that the aircraft must comply with during the emergency descent;

means for determining, automatically, a set of lateral directives, which represents a lateral maneuver to be carried out during the emergency descent;

means for automatically guiding the aircraft, upon engagement of an automatic emergency descent function, so that it complies simultaneously with said set of vertical directives and said set of lateral directives until it attains said target altitude which it thereafter maintains; and means allowing a pilot of the aircraft to manually interrupt said automatic guidance, is noteworthy in that said engagement means comprise, for automatically engaging said (automatic) emergency descent function:

means for automatically determining a variation in altitude of the cabin of the aircraft, which depends on a variation in the pressure measured inside the cabin;

means for automatically determining an engagement criterion which depends on said variation in altitude of the cabin;

means for automatically comparing this engagement criterion with a predetermined threshold value; and means for automatically ordering the engagement of said emergency descent function, when said engagement criterion is above said threshold value for a predetermined duration.

Consequently, the device in accordance with the invention is able to greatly advance the automatic triggering of the (automatic) emergency descent function, in particular with respect to a triggering using an engagement criterion which is based only on the measurement of the pressure inside the cabin, thereby making it possible to considerably reduce the risk related to hypoxia. A study has made it possible to measure a time saving that may vary from several tens of seconds to more than a minute depending on the assumptions taken into account (pressure threshold, pressure variation threshold). These values are very beneficial knowing that the useful consciousness time in the event of exposure to very high altitude is only a few tens of seconds.

Furthermore, in a preferred embodiment, said device comprises, moreover:

means for automatically monitoring the value of at least one parameter making it possible to detect structural damage of the aircraft and for automatically determining, in the event of detecting structural damage, a severity level of the structural damage; and means for automatically adapting said target speed to said severity level of the structural damage.

This embodiment therefore makes it possible to detect the presence of structural damage automatically and to moderate, in the event of detection, the descent speed automatically, so as to avoid the occurrence of additional damage in the structure of the aircraft.

The present invention also relates to an aircraft which is furnished with a device such as the aforesaid.

BRIEF DESCRIPTION OF THE DRAWINGS

The figures of the appended drawing will elucidate the manner in which the invention may be embodied. In these figures, identical references designate similar elements.

DETAILED DESCRIPTION OF THE INVENTION

Figure 1:
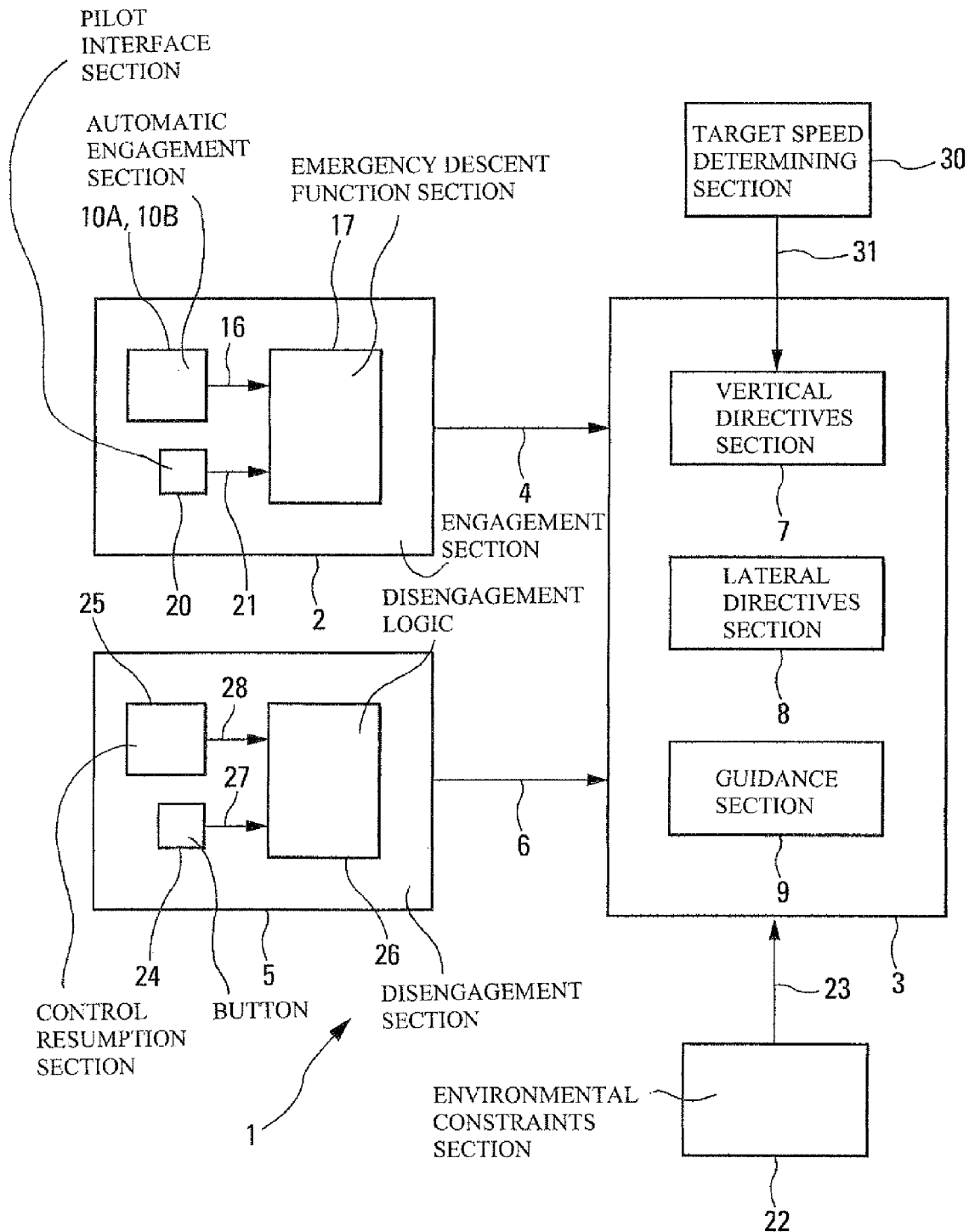
FIG. 1 is the schematic diagram of an automatic control device in accordance with the invention.

The device 1 in accordance with the invention and represented schematically in FIG. 1 is intended to automatically control an emergency descent of an aircraft (not represented), in particular of a transport airplane, especially if there is a problem with the pressurization of the aircraft, when it is flying at high altitude, in particular at a cruising altitude.

To carry out an automatic emergency descent, said device 1 comprises:

engagement means 2 which are able to engage an automatic emergency descent function;

control means 3 which are connected by way of a link 4 to said engagement means 2 and which are formed so as to implement an automatic emergency descent function, when it is engaged by said means 2, by automatically carrying out longitudinal guidance, lateral guidance and control of the speed of the aircraft; and disengagement means 5 which are connected by way of a link 6 to said control means 3 and which make it possible to order a disengagement of a currently executing automatic emergency descent function.

The automatic emergency descent function thus makes it possible to return the aircraft to a breathable altitude (target altitude) and in a stabilized situation, with a view in particular to reviving (if necessary) the crew and the passengers and to continue the flight.

Said control means 3 comprise:

means 7 for determining, automatically, a set of vertical directives, comprising in particular:

the target altitude which represents the altitude to be attained by the aircraft at the end of the emergency descent; and a target speed which represents the speed that the aircraft must comply with during the emergency descent;

means 8 for determining, automatically, a set of lateral directives. This set represents a lateral maneuver to be carried out during the emergency descent; and standard means 9 for automatically guiding the aircraft, upon engagement of an automatic emergency descent function, so that it complies simultaneously with said set of vertical directives and said set of lateral directives, doing so until it attains said target altitude, which target altitude it maintains as soon as it has attained it.

When the aircraft is stabilized on the target altitude, at the end of the descent, the crew can in particular request information from the air traffic control relating to subsequent operations. The lateral trajectory followed during the descent is generally maintained at the end of the descent.

Figure 2:
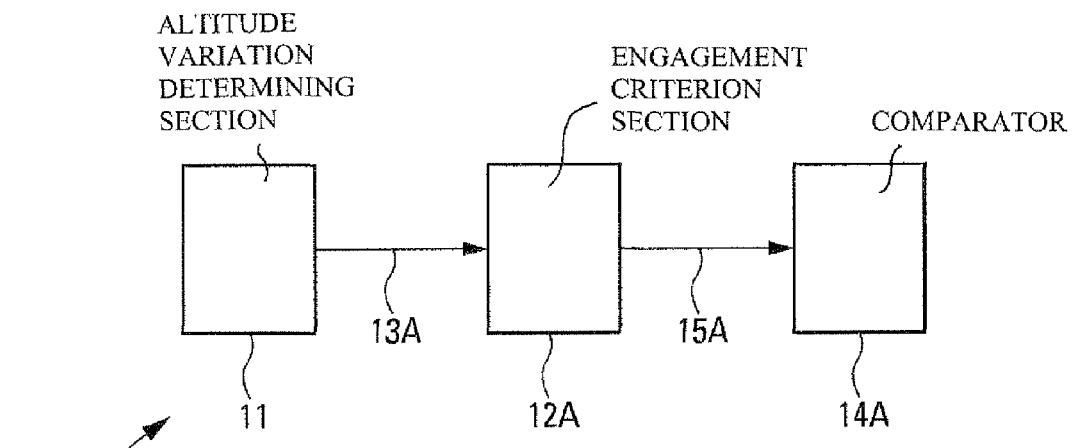
FIGS. 2 to 4 show schematically particular embodiments of means forming part of an automatic control device in accordance with the invention.
Figure 3:
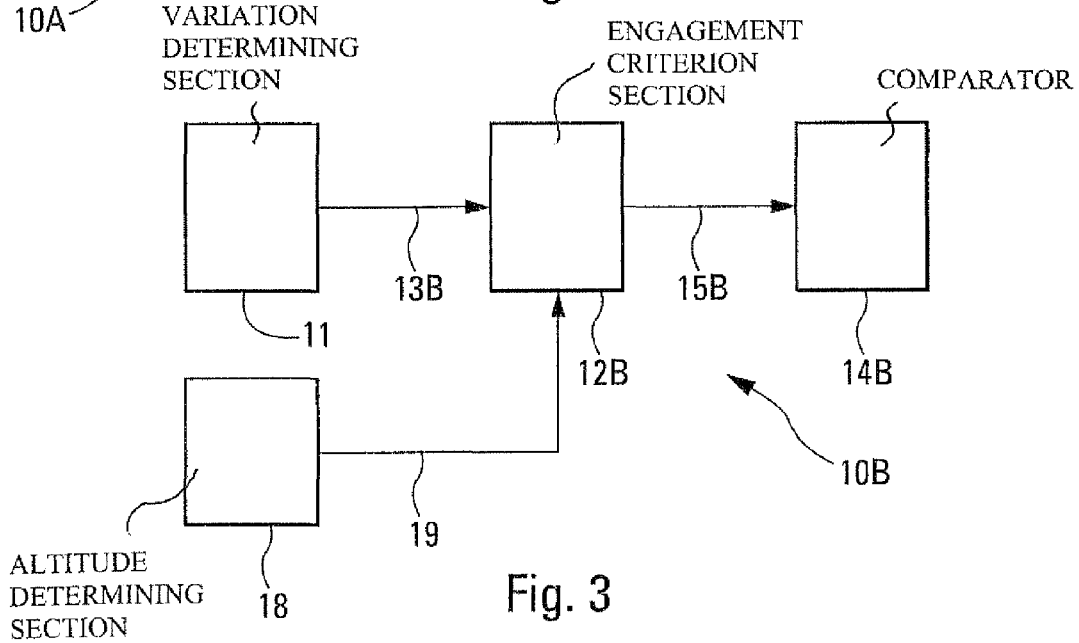

According to the invention, to obtain optimized automatic engagement of the emergency descent function, said engagement means 2 comprise means of automatic engagement 10A, 10B which comprise at least, as represented in FIGS. 2 and 3:

means 11 for automatically determining a variation in altitude of the cabin of the aircraft. Accordingly, these means 11 comprise at least one standard element, for example a sensor, which measures the pressure inside the cabin of the aircraft, on the basis of which it is possible to determine a pressure variation;

means 12A, 12B which are connected by way of a link 13A, 13B to said means 11 and which are formed so as to automatically determine an engagement criterion, specified below, which depends at least on said variation in altitude of the cabin, that is to say on said measured variation in the pressure inside the cabin; and comparison means 14A, 14B which are connected by way of a link 15A, 15B to said means 12A, 12B and which are formed so as to automatically compare the engagement criterion determined by said means 12A, 12B with a predetermined threshold value.

The results of this comparison are transmitted by way of a link 16 to means 17 which order the automatic engagement of the emergency descent function, when said comparison means 14A, 14B indicate that the engagement criterion is above the threshold value, and is so for a predetermined duration, for example for ten seconds. Such a situation corresponds to a significant decompression (that is to say to a significant pressure variation in the direction of a dip in the pressure of the cabin) which is equivalent to a significant variation in the altitude of the cabin in the direction of an increase in this altitude.

Thus, the means of engagement 2 of the device 1 in accordance with the invention take account of the variation in altitude of the cabin, that is to say of the variation in the pressure inside the cabin (comprising the passenger cabin and the flight deck), to determine an automatic criterion for engaging the (automatic) emergency descent function.

According to the invention, the emergency descent is therefore triggered automatically by the means 2 as soon as a sizable drop in the pressure is observed inside the cabin, without having to wait for the pressure to dip sufficiently and cross a critical pressure threshold. The engagement means 2 therefore make it possible to advance, in the event of a pressurization problem, the automatic engagement of the (automatic) emergency descent function. The time thus saved in the triggering of the emergency descent makes it possible to curtail to the maximum the time spent by the crew and the passengers at too high an altitude, incompatible with human life, thus limiting the risk of hypoxia.

In the first embodiment represented in FIG. 2, said means 10A use said variation in altitude of the cabin directly as engagement criterion, and said means 14A compare this altitude variation with a predetermined threshold value, for example with 2000 feet/minute. This first embodiment is therefore particularly simple.

Furthermore, in a second preferred embodiment, represented in FIG. 3:

said means 10B comprise, moreover, means 18 for determining an altitude of the cabin of the aircraft. Preferably, these means 18 comprise a standard sensor for measuring the pressure inside the cabin, which they transmit by way of a link 19 to said means 12B; and said means 12B determine the engagement criterion as a function at one and the same time of said variation in altitude of the cabin (which depends on a measured variation in the pressure inside the cabin), received from said means 11, and of said altitude of the cabin (which depends on a pressure measured inside the cabin), received from said means 18.

In this case, said means 12B calculate, preferably, one of a plurality of possible engagement criteria x1, x2 and x3. These means 12B calculate said engagement criterion, by using the appropriate corresponding expression from among the following expressions:

$$\begin{cases} x1 = G1ac.Ac + G1vac.Vac \\ x2 = [(G2ac.Ac)^2 + (G2vac.Vac)^2]^{1/2} \\ x3 = [(G3ac.Ac)^n + (G3vac.Vac)^n]^{1/n} \end{cases}$$

in which:
Ac represents said altitude of the cabin;
Vac represents said variation in altitude of the cabin;
n is an integer greater than 2; and
G1ac, G2ac, G3ac, G1vac, G2vac and G3vac are predetermined gain values.

Said means 14B compare, in this preferred embodiment, the engagement criterion chosen from among said criteria x1, x2 and x3 with a corresponding threshold value, and they inform said means 17 when the chosen engagement criterion is above the corresponding threshold value.

As represented in FIG. 1, said engagement means 2 can moreover comprise means 20, for example a push-button, a rotary pull-knob, or a lever of the airbrakes, which can be actuated manually by a pilot of the aircraft, and which are connected by way of a link 21 to said means 17. By virtue of these means 20, the engagement of the emergency descent function can be carried out intentionally, at any moment if the aircraft is above 30 000 feet, through a manual action of a crew member.

Said means 17 can therefore order an engagement of the emergency descent function, either following a manual actuation carried out by way of said means 20, or following an automatic command received from said means 10A, 10B.

Said device 1 comprises, moreover, means 22 which by way of a link 23 provide internal and external constraints relating to the environment and the state of the aircraft, to said control means 3 to allow them to carry out their aforesaid functions. These functions relate to guidance and control of the speed of the aircraft at one and the same time in the longitudinal plane and in the lateral plane.

It will be noted that said means 7 (which relate to the longitudinal plane) determine the target altitude as a function:
of a standard safety altitude, at which it is possible to breathe without an oxygen mask; or
of a minimum altitude, to which it is possible to descend as a function of the relief; or
of both the above altitudes.

Furthermore, said means 7 determine the target speed as a function in particular of the time that one allows for performing the descent. In particular, if one wishes to carry out the descent in a minimum time, the target speed will correspond to the maximum speed that the aircraft can attain.

Additionally, said means 8 (which relate to the lateral plane) determine a set of lateral directives making it possible to meet the following objectives:
optimize the descent rate of the aircraft. For this purpose, it is known that the larger the angle of roll of the aircraft, the bigger its descent rate;
deviate from the current route, so as to move away from the surrounding traffic. The longitudinal maneuver performed by the aircraft may, specifically, come into conflict with that of airplanes deploying on the same route, but at lower altitudes; and/or
divert to a secondary airport. Since the emergency descent function brings the aircraft to low altitude, its fuel consumption is increased, and it may happen that the aircraft can then no longer make it to the initially scheduled destination airport. It may therefore be necessary, right from the start of the emergency descent, to direct the aircraft to a diversion airport.

Additionally, in a particular embodiment, said disengagement means 5 which at any moment allow a pilot to resume control of guidance, for example when he regains consciousness after a loss of consciousness, comprise:
a dedicated button 24;
standard means 25 for resuming control, in particular means forming part of an automatic pilot, of a flight director or of an automatic thrust control. This resumption of control can correspond, for example, to the engagement of a new mode, to a manual action on the control stick, to an action on a button for disconnecting the automatic pilot or the automatic thrust control, or to an action on a button for engaging the automatic pilot, the flight director or the automatic thrust control; and
disengagement logic 26 which is connected by way of links 27 and 28 respectively to said button 24 and to said means 25.

Additionally, in a preferred embodiment, said device 1 comprises, moreover, means 30 which are for example connected by way of a link 31 to said means 7 and which are formed so as to automatically adapt the target speed used during the emergency descent to any automatically detected structural damage.

Figure 4:
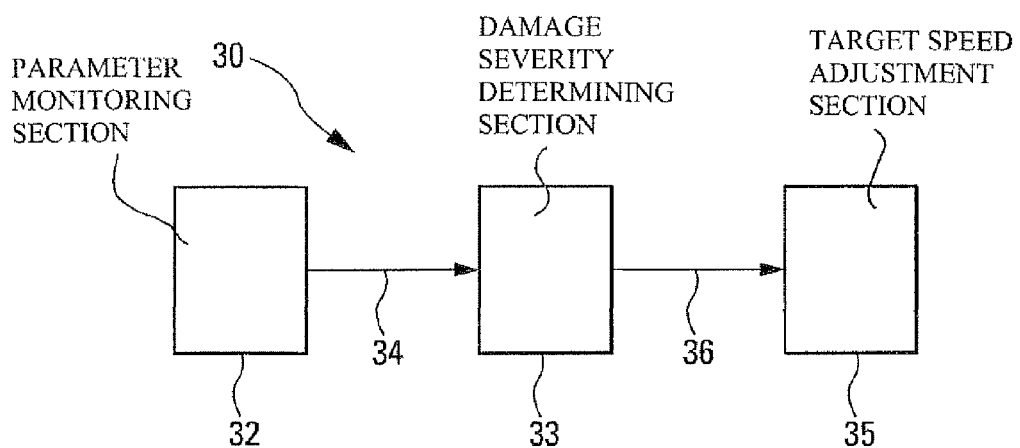

Accordingly, said means 30 comprise, as represented in FIG. 4:
means 32 for monitoring the value of at least one parameter making it possible to detect structural damage of the aircraft. This monitoring is based on the variation in the pressure of the air in the cabin. In a preferred embodiment, said means 32 measure in a standard manner the pressure variation, compare it with a predetermined threshold, and detect structural damage when this pressure variation is above said threshold;
means 33 which are connected by way of a link 34 to said means 32 and which are formed so as to determine a severity level of the structural damage, in the event of detecting such structural damage. More precisely, said means 33 are formed so as to estimate the size T of a hole in the structure of the aircraft, corresponding to structural damage, as a function of the variation in the pressure of the air in the cabin received from said means 32; and
means 35 which are connected by way of a link 36 to said means 33 and which are formed so as to adapt the target speed Vc to the level of the severity of the structural damage, in the event of detecting such structural damage. More precisely, these means 35 are formed so as to adapt the target speed Vc used by said means 7 to the size T of the hole in the structure, such as estimated by said means 33.

In this preferred embodiment, the presence of structural damage is detected and a corresponding severity level is deduced, as a function of the decompression rate (that is to say of the variation in the pressure in the direction of a dip) which may be represented by an increase (deemed equivalent) in the altitude of the cabin.

Figure 5:
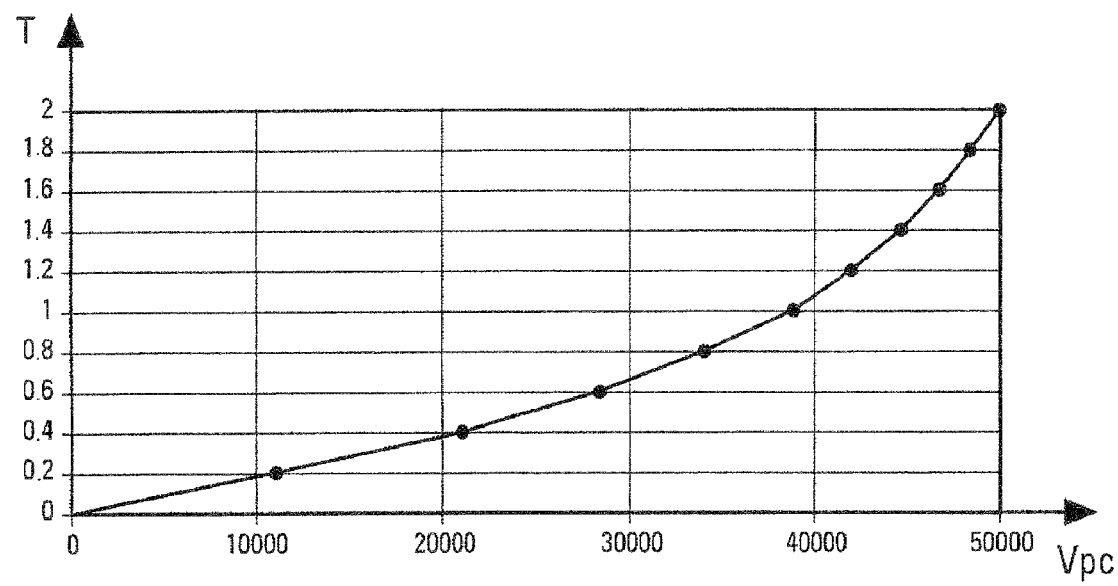
FIGS. 5 and 6 are graphs making it possible to explain an adaptation, carried out in accordance with the present invention, of a descent speed to a severity level of structural damage.

Preferably, said means 33 estimate the size of the hole in the structure of the aircraft as a function of the variation in the pressure of the air in the cabin (that is to say as a function of the decompression rate), by using a graph such as that represented in FIG. 5 which provides the size T (expressed for example in square meters) of the hole directly as a function of the variation Vpc in the cabin pressure (expressed for example in feet per minute). In the example of FIG. 5, the following initial assumptions have been used:

the altitude of the cabin is at 7500 feet (about 2300 meters); and the altitude of the aircraft is at 43 000 feet (about 13 000 meters).

On the basis of the above calculation of the estimated size of the hole in the structure, it is possible to estimate the point at which the structure of the aircraft is damaged and to associate therewith a maximum speed value not to be exceeded. Accordingly, said means 35 can use two different schemes.

According to a first scheme, said means 35 compare the size T of the hole with a predefined threshold value, and they consider that the target speed corresponds:

to a speed VMO/MMO, that is to say to a maximum speed of use, when the estimated size of the hole is less than or equal to said threshold value, for example 0.5 m$^2$; or to the current speed of the aircraft, when the size of the hole is greater than said threshold value.

Figure 6:
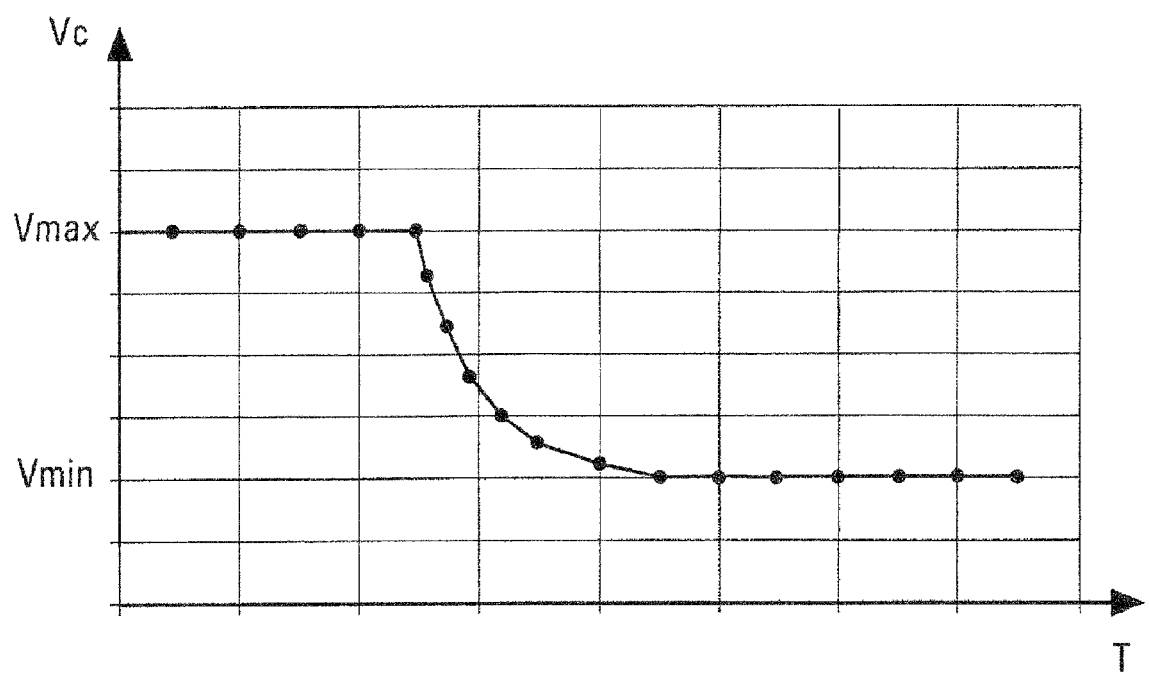

Furthermore, according to a second scheme, said means 35 determine the target speed Vc as a function of the estimated size T of the hole, by using a graph such as that represented in FIG. 6 which provides a speed value directly for a given size value, in which:

the speed Vmax corresponds to the speed VMO/MMO; and the speed Vmin corresponds to the minimum speed of use.

This graph of FIG. 6 can be determined with the aid of theoretical models.

Thus, by virtue of this preferred embodiment, the device 1 is able to detect structural damage, and, in the event of detecting such structural damage, to adapt the target speed Vc (that is to say the descent speed during the emergency descent) to the severity of said structural damage. This embodiment therefore makes it possible to adapt the speed of the aircraft to the state of its structure. Moreover, this adaptation is carried out automatically, this being particularly advantageous when the pilot is no longer able to carry out such an adaptation, for example in the event of loss of consciousness.

The invention claimed is:

1. A method of automatic control of an emergency descent of an aircraft, according to which method, when an automatic emergency descent function is engaged, the following successive operations are carried out:

a) determining automatically a set of vertical directives, said directives comprising:

a target altitude which represents an altitude to be attained by the aircraft at the end of the emergency descent; and a target speed which represents a speed that the aircraft must comply with during the emergency descent;

b) determining automatically a set of lateral directives, which represents a lateral maneuver to be carried out during the emergency descent; and c) guiding the aircraft automatically so that it complies simultaneously with said set of vertical directives and said set of lateral directives until it attains said target altitude which it thereafter maintains, said automatic guidance possibly being interrupted by an action of a pilot of the aircraft, according to which method, to automatically engage said emergency descent function, the following operations are carried out in an automatic manner:

α1) determining a variation in altitude of the cabin of the aircraft, which depends on a variation in the pressure measured inside the cabin;

β1) determining an engagement criterion which depends on said variation in altitude of the cabin;

γ1) comparing this engagement criterion with a predetermined threshold value; and δ1) engaging said emergency descent function when said engagement criterion is above said threshold value, wherein:

in step δ1), said emergency descent function is engaged when said engagement criterion is above said threshold value for a predetermined duration, and in step a), the following operations are moreover carried out in an automatic manner:

in a step α2):

a variation in the pressure of the air in the cabin is monitored; and the size of a hole in the structure of the aircraft, corresponding to structural damage, is estimated as a function of said variation in the pressure of the air in the cabin; and in a step β2), said target speed is adapted to said estimated size of the hole in the structure of the aircraft.

2. The method as claimed in claim 1, wherein said engagement criterion corresponds to said variation in altitude of the cabin.

3. The method as claimed in claim 1, wherein:

in step α1), an altitude of the cabin of the aircraft, which depends on a pressure measured inside the cabin is moreover determined; and in step β1), an engagement criterion is determined as a function at one and the same time of said variation in altitude of the cabin and of said altitude of the cabin.

4. The method as claimed in claim 3, wherein in step β1), one of the following engagement criteria x1, x2 and x3 is calculated:

$$\begin{cases} x1 = G1ac.Ac + G1vac.Vac \\ x2 = [(G2ac.Ac)^2 + (G2vac.Vac)^2]^{1/2} \\ x3 = [(G3ac.Ac)^n + (G3vac.Vac)^n]^{1/n} \end{cases}$$

for which:

Ac represents said altitude of the cabin;

Vac represents said variation in altitude of the cabin;

n is an integer greater than 2; and

G1ac, G2ac, G3ac, G1vac, G2vac and G3vac are predetermined gain values.

5. The method as claimed in claim 1, wherein means are provided allowing a pilot to manually engage said emergency descent function.

6. A device for the automatic control of an emergency descent of an aircraft, said device comprising:

engagement means able to engage an automatic emergency descent function;

means for determining, automatically, a set of vertical directives comprising:

a target altitude which represents an altitude to be attained by the aircraft at the end of the emergency descent; and a target speed which represents a speed that the aircraft must comply with during the emergency descent;

means for determining, automatically, a set of lateral directives, which represents a lateral maneuver to be carried out during the emergency descent;

means for automatically guiding the aircraft, upon engagement of an automatic emergency descent function, so that it complies simultaneously with said set of vertical directives and said set of lateral directives until it attains said target altitude which it thereafter maintains; and means allowing a pilot of the aircraft to manually interrupt said automatic guidance, said engagement means comprising, for automatically engaging said emergency descent function:

means for automatically determining a variation in altitude of the cabin of the aircraft, which depends on a variation in the pressure measured inside the cabin;

means for automatically determining an engagement criterion which depends on said variation in altitude of the cabin;

means for automatically comparing this engagement criterion with a predetermined threshold value; and means for automatically ordering the engagement of said emergency descent function, when said engagement criterion is above said threshold value, wherein said device comprises, moreover:

means for automatically monitoring a variation in the pressure of the air in the cabin;

means for automatically estimating the size of a hole in the structure of the aircraft, corresponding to structural damage, as a function of said variation in the pressure of the air in the cabin; and means for automatically adapting the target speed to said estimated size of the hole in the structure of the aircraft.

7. An aircraft, which comprises a device such as that specified under claim 6.

* * * * *